United States Patent [19]

Campanini

[11] 4,343,498

[45] Aug. 10, 1982

[54] SWIVEL HOSE COUPLING

[76] Inventor: Sergio Campanini, 224 E. Miller Rd., Iola, Kans. 66749

[21] Appl. No.: 193,993

[22] Filed: Oct. 6, 1980

[51] Int. Cl.³ .............................................. F16L 33/22
[52] U.S. Cl. .................... 285/174; 285/243; 285/272; 285/179
[58] Field of Search .............. 285/174, 272, 243, 252, 285/253, 256, 179

[56] References Cited

U.S. PATENT DOCUMENTS

| | | | |
|---|---|---|---|
| 409,066 | 8/1889 | Ravenel | 285/243 |
| 708,117 | 9/1902 | Bowers | 285/243 |
| 3,073,628 | 1/1963 | Cline et al. | 285/243 |
| 3,191,975 | 6/1965 | La Marre et al. | 285/243 |
| 3,222,091 | 12/1965 | Marshall | 285/243 X |
| 3,367,681 | 2/1968 | Braukman | 285/174 X |
| 4,288,110 | 9/1981 | Grenell | 285/174 |

FOREIGN PATENT DOCUMENTS

| | | | |
|---|---|---|---|
| 972105 | 10/1964 | United Kingdom | 285/272 |
| 1215980 | 12/1970 | United Kingdom | 285/256 |

*Primary Examiner*—Thomas F. Callaghan
*Attorney, Agent, or Firm*—Dowell & Dowell

[57] ABSTRACT

A swivel coupling for terminating the end of a hose made of resilient material, the coupling having a tubular nipple with a barbed end entering the hose and a cylindrical end extending from the hose and having an O-ring seal extending therearound, and the coupling including a screw threaded fitting surrounding the cylindrical end of the nipple and sealed thereto by the O-ring and having an annular abutment adjacent to the hose, and the coupling further including an annular collar, separable into sectors in the form of shell portions which surround the hose and squeeze it against the barbed nipple, the collar having a grooved structure overlying the annular abutment of the screw fitting and retaining the fitting close to the hose while permitting it to swivel with respect to its axis.

7 Claims, 9 Drawing Figures

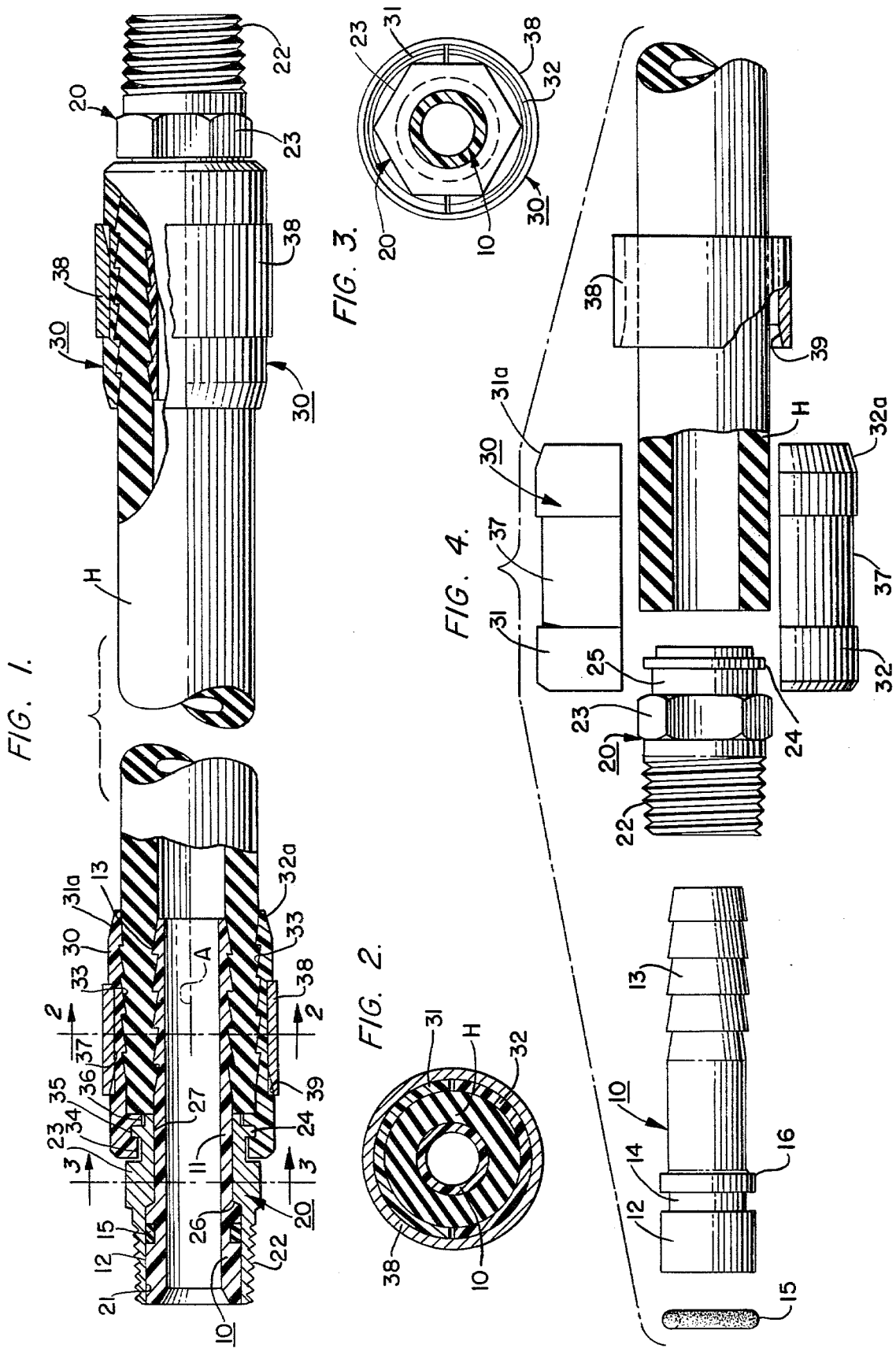

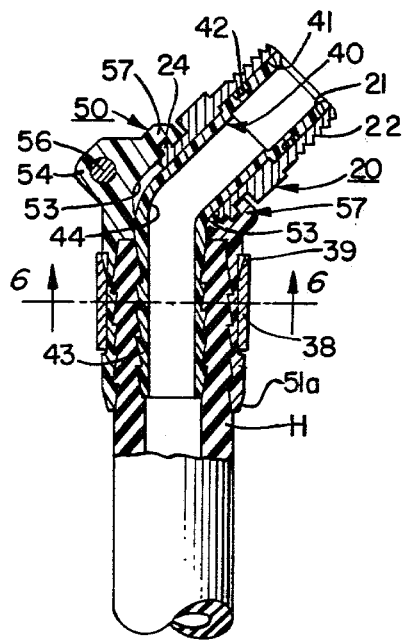
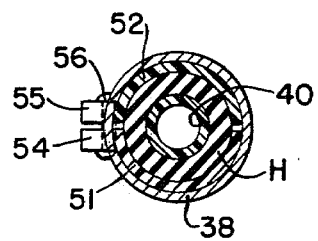
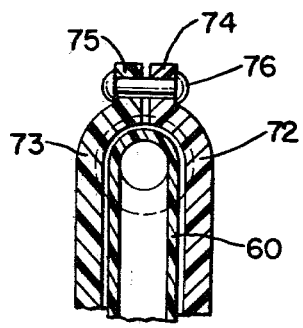
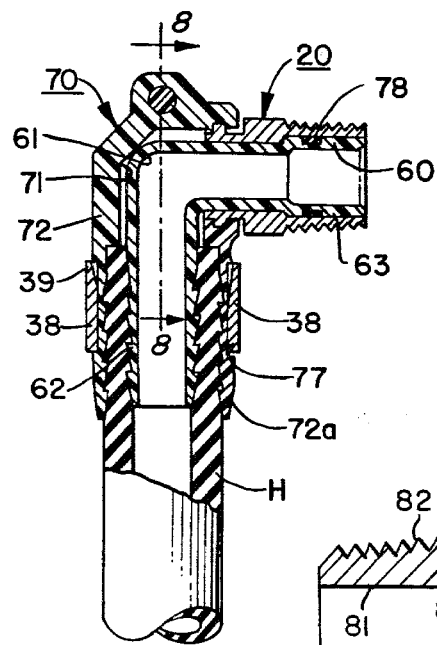
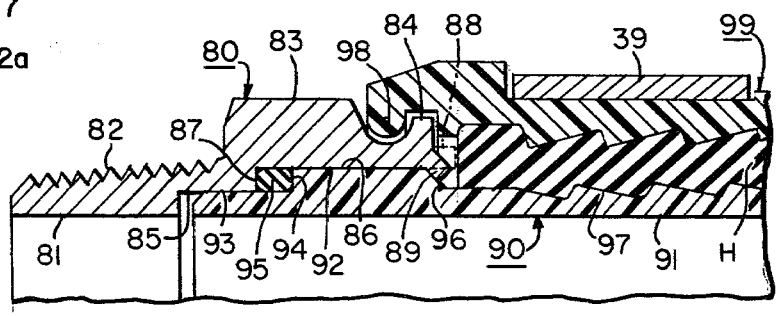

SWIVEL HOSE COUPLING

BACKGROUND AND PRIOR ART

There are many patents showing hose couplings for terminating a hose of the type used for air brake pressure lines, gasoline line, water hoses, etc. However, in most cases those hose couplings which would be the most satisfactory are relatively expensive to manufacture. Therefor a less expensive type of hose coupling is often used which is not entirely satisfactory. One of the most common types of couplings is shown in U.S. Pat. No. 2,430,921 to Edelmann which includes a tubular nipple slidably received in the end of the hose and held thereon by a metal cup which is initially large enough to slide over the end of the hose easily but is subsequently crimped or spun inwardly against the hose to captivate it to the nipple. This type of coupling suffers from several disadvantages. In the first place, it is not entirely reliable because the process of crimping or spinning the cup onto the hose cannot achieve a precise pressure on the hose which is invariable from product to product. The type of metal used in the cup tends to vary in its physical characteristics, and this variation produces cups which when spun onto the hose can be embrittled, cracked in a manner that does'nt show in an inspection, and perhaps unable to maintain their newly crimped positions around the hose. Moreover, these cups are generally made of plated steel, and crimping or spinning of the cup tends to destroy the finish so that the cup is easily attacked by corrosive materials encountered during use of the hose, for instance, the salt spread on highways or acids contained in the atmosphere. Therefore, the stability of the shape of the deformed cup may become unpredictable, unstable and/or unreliable with the passage of time.

Moreover, when attached to a mating coupling this type of unit depends for its seal upon the deformation of the outer end of the tubular nipple. Therefore, once the unit has been coupled, it is no longer reliable to achieve a leak-proof connection if it is removed and reapplied a second time.

Efforts to overcome such disadvantages have often resulted in a complex and expensive coupling, for example such as is shown in U.S. Pat. No. 3,999,781 to Todd, which structure uses a large number of parts which require complicated machining. Another approach to attaching a coupling to a hose has been to place a ferrule around the outer surface of the hose and then jam a nipple into the hose which causes the hose to be driven radially outwardly into tight contact with the ferrule. This assembly, however, has certain disadvantages. One disadvantage is that when the nipple is driven into the hose, the nipple tends to drive it axially out of the ferrule so that the linear length of the engagement between the ferrule and the hose is uncertain. Another disadvantage is that this type of coupling provides no interengagement between the ferrule and the screw threaded fitting, whereby all of the strain tending to pull the hose out of the coupling must be borne by the barbs on the nipple. U.S. Pat. No. 3,262,721 to Knight is of this type.

The above disadvantages are obviated by the structure of U.S. Pat. No. 4,152,016 to Weinhold which shows a positive clamping means for clamping the hose onto the barbed nipple, which clamping means also has means which interengage with the threaded fitting and hold the fitting longitudinally to the hose, while allowing it to rotate with respect thereto, a separate annular seal also being provided between the nipple and the threaded fitting. However, this structure is still more complicated and expensive to manufacture then necessary, and provides a coupling whose outer diameter is unnecessarily bulky and subject to being snagged accidentally.

Copies of the four patents mentioned above are attached to this application in lieu of a prior art statement.

THE INVENTION

The invention comprises an improved swivel coupling for connection with the end of a resilient hose, and including a tubular nipple having an outer surface which includes an annular barbed portion insertable in the bore of the hose and a cylindrical portion which extends beyond the hose and is received in the central passage which extends through a screw threaded fitting having a cylindrical internal wall receiving the cylindrical portion of the nipple and sealed thereto by an O-ring, the screw fitting having a threaded portion extending away from the hose with wrench flats adjacent to the threaded portion, and the fitting having an annular abutment extending around the fitting and located away from the threaded portion. In one embodiment of the coupling the screw fitting terminates in an annular sleeve portion that can be spun inwardly to cooperate with a shoulder on the nippple to retain it engaged in the screw fitting. The swivel coupling further includes an annular collar which is divided longitudinally of the coupling to provide multiple sectors or shell portions, which when assembled together form a substantially annular internal surface having ribs therearound which are located such that when the hose is inserted within the shell portions and they are clamped tightly together, the annular ribs clamp the hose securely to the barbed portion of the nipple. The collar also has an end portion which has an internal annular retaining member shaped to rotatably engage the annular abutment of the screw fitting, thereby providing a sort of tongue and groove interengagement operative to prevent longitudinal separation of the fitting from the collar, and the collar being held tightly clamped on the hose by one or more separable retaining means. The swivel coupling can be angled so as to provide a 45° fitting or a 90° fitting, providing the bend is made in the nipple and in the annular collar at a position such that the bend is displaced away from the interengaging abutment means and away from the screw fitting toward the hose.

OBJECTS AND ADVANTAGES OF THE INVENTION

It is a principle object of this invention to provide a swivel coupling wherein there is an additional annular interlocking structure between the collar which compresses the hose against the barbed end of the nipple and the screw threaded fitting of the assembly, so that the mechanical integrity of the engagement between the hose and the fitting is independent of the fluid-tight integrity therebetween, the coupling being greatly strengthened by this additional annular interlocking arrangement.

It is another major object of the invention to provide a swivel coupling in which the fluid-tight integrity of the coupling is provided by an annular seal between the cylindrical end of the nipple and the internal cylindrical passage through the threaded fitting, whereby no deformation is required of the nipple or the fitting in order to achieve fluid sealing of the coupling. As a result, the coupling can be used over and over again to connect to a complementary mating fitting because its parts are not permanently deformed in order to achieve a seal. The type of coupling in which deformation of a part (of the nipple) is necessary in order to achieve a seal is shown in the above mentioned U.S. Pat. No. 2,430,921, which does not lend itself well to being removed and reseated plural times.

It is another object of the invention to provide a swivel coupling in which the fluid-tight seal between the nipple and the threaded fitting is independent of the torque required to seat the threaded fitting during installation.

Still another important object of the invention is to provide a swivel coupling in which the collar and nipple members can be made of plastic, and in which the mechanical stability of the grip of the collar and the nipple on the hose depends upon the molded interior shape of the collar and exterior shape of the nipple, which shapes are not subject to severe distortion while installing the collar and nipple at the end of the hose. In particular, it is the object of this invention to avoid the use of a metal cup which must be spun or crimped onto the hose, and which is therefore subject to embrittlement, cracking or corrosion in zones where the plating on the metal is destroyed during the crimping operation.

It is a further object of the invention to provide a collar which is longitudinally divided into multiple sectors comprising indentical shell portions which can be subsequently held together by a metal band forced onto the shell portions by compressing the hose sufficiently to slide the band into a groove around the collar. This type of construction provides a coupling which can be made less expensively and which is stronger and more reliable then many of the more complicated mechanical structures used in the prior art, and at the same time is easier to install at the end of a hose.

Other objects and advantages of the invention will become apparent during the following discussions of the drawings.

THE DRAWINGS

FIG. 1 is an elevation view partly in cross section showing a length of hose having a swivel coupling according to the invention located at each end;

FIG. 2 is a section view taken along line 2—2 of FIG. 1;

FIG. 3 is a section view taken along line 3—3 of FIG. 1;

FIG. 4 is an exploded view showing a swivel coupling according to the present invention ready for installation to a hose;

FIG. 5 is an elevation view partly in cross section showing a swivel coupling according to the present invention modified to provide a 45° coupling;

FIG. 6 is a section view taken along line 6—6 of FIG. 5;

FIG. 7 is a elevation view partly in cross section showing a still further modified coupling which provides a 90° coupling;

FIG. 8 is a section view taken along line 8—8 of FIG. 7; and

FIG. 9 is another embodiment of the invention similar to FIG. 1 but modified as to the engagement of the screw fitting with the tubular nipple.

PREFERRED EMBODIMENT

Referring now to the drawings, the Figures show a length of hose H to which a swivel coupling is connected. As shown in FIGS. 1 through 4, the coupling comprises a tubular nipple 10 having a central opening 11 extending therethrough, and having on its outer surface a cylindrical portion 12 near one end and an annularly barbed portion 13 near the other end. In the vicinity of the cylindrical end 12, there is an annular groove 14 in which an annular seal 15 such as an O-ring is inserted.

The coupling further includes a screw threaded fitting 20 having a passage 21 through its center which comprises a cylindrical wall portion snugly receiving the cylindrical portion 12 of the nipple 10, and sealing against the O-ring 15. The fitting 20 further includes a threaded portion 22 which faces away from the hose H and has wrench flats 23 of hexagonal shape located adjacent to the threaded portion 22. Near the end of the fitting 20 which is located adjacent to the hose, the fitting includes an annular abutment 24 which in the illustrated embodiment comprises an annular ring around the body 25 of the fitting, although the shape of the abutment 24 need not necessarily be cylindrical. The internal cylindrical wall portion 21 of the fitting 20 is stepped as at 26 to a smaller internal diameter 27, and this shoulder 26 lies against the annular shoulder 16 around the nipple as can be seen in FIG. 4, thereby preventing the nipple 10 from being pulled all the way through the threaded fitting 20. The hose H is compressed tightly against the barbed portion 13 of the nipple 10 by an annular collar 30 which is divided longitudinally of the axis A of the fitting, thereby dividing the collar into multiple sectors comprising shell portions such as 31 and 32 as can be seen in FIG. 4. Although only two such shell portions are shown in the drawings, it is to be understood that the collar 30 can be divided into three or more shell portions as may be desired. The collar 30 and its shell portions 31 and 32 have annularly ribbed internal surfaces 33 which are designed to provide an undulating engagement with the outer surface of the hose H and squeeze it into the barbed portion 13 of the nipple 10. Moreover, the collar 30, when assembled, has an annular internal retaining structure which is labeled 34, 35, and 36 in FIG. 1 and is designed to surround the abutment ring 24 of the fitting 20 and thereby hold it against longitudinal displacement in the direction of the axis A with respect to the collar 30 and the hose H. The structures 34, 35 and 36, taken with the abutment ring 24 provide a sort of annular tongue and groove arrangement which permits rotation of the fitting 20 with respect to the collar 30 during installation or removal of the swivel coupling to some other mating fitting (not shown).

The shell portions 31 and 32 of the annular collar 30 are held tightly pressed against the hose H by a band 38 which surrounds the shell portions of the collar 30 and its into an annular groove 37. It will be noted that the band 38 is large enough to overlie the hose H and freely slide thereon, but that the shell portions 31 and 32 are beveled at the ends 31a and 32a to match the bevel 39 located internally at one end of the band 38. When the shell portions 31 and 32 are being installed on the hose, they are mechanically squeezed onto the outer periphery of the hose H by a suitable tool (not shown) tightly enough so that the band 38 can be forced over the shell portions and into the groove 37 by applying axial thrust to the band 38, whereby to drive its tapered portion 39 upwardly onto the bevels 31a and 32 a of the shell portions of the collar 30. After the band 38 has been snapped into the groove 37 around the annular 30, the collar is then allowed to expand slightly outwardly against the band, the diameter of the band being such as to maintain proper compression between the collar, the hose, and the barbed outer surface 13 of the nipple 10. Thus, once the swivel coupling has been fully installed upon the hose H, the only part which undergoes any substantial distortion from its original shape is the hose H, the band 38 and the collar 30 being substantially rigid and nondeformable.

Although it is an advantage of the invention that the nipple 10 and the collar 30 can be made of plastic, as shown in the preferred embodiment, there is no reason why these parts cannot be made of metal or any other suitable material which is dimensionally stably and non-corrodable. The threaded fitting 20 is preferably made of brass or some other non-corrodable metal, whereas the band 39 can be made of steel suitably protected on its outer surface by plating.

Referring now to the 45° swivel coupling which is the modification shown in FIGS. 5 and 6, this coupling comprises a nipple 40 which is similar to the nipple 10 in that it has a cylindrical end 41 with an O-ring seal 42 at one end, and a barbed portion 43 at the other end, but differs from the nipple in FIG. 1 in that it is bent in the vicinity of the reference character 44, so that the nipple ends are disposed at a 45° angle with respect to each other. This can of course be any other desired angle. The threaded fitting shown in FIGS. 5 and 6 is identical to the fitting 20 shown in FIG. 1 and is therefore provided with the same reference characters to designate its passage 21, its threaded portion 22 and its annular retaining abutment ring 24, etc. The collar 50 is however different from the collar 30 shown in FIG. 1. The lower part of the collar is similar to the extent that it includes two separable halves 51 and 52 as can be seen in FIG. 6, the shell portion 51 being visible in FIG. 5 and including a bevel 51a which cooperates with the band 38 which is identical to the band 38 in FIG. 1 and serves a similar purpose.

Like the nipple 40, the collar 50 is bent at the location 53 so that it follows the contour of the nipple 40. The two halves 51 and 52, however, further include on each shell portion a lug which is labeled 54 on shell 51 and 55 on shell 52. These lugs are screwed or riveted together as shown at 56, whereby the shell portions 51 and 52 are held together both by the band 38 and also by the rivet 56 which is just on the other side of the bend from the band 38. The collar also includes an internal tongue and groove retaining structure which is generally referred to by the reference character 57 and which surrounds the abutment ring 24 on the threaded fitting 20 for the same purpose as the parts 34, 35 and 36 in FIG. 1.

Referring to the second modified embodiment shown in FIGS. 7 and 8, the coupling comprises a 90° coupling which uses a tubular nipple 60 which is similar to the nipples 10 and 40 except that it is bent 90° in the vicinity of the reference character 61. The barbed end 62 and the cylindrical end 63 are similar to similar portions in the other embodiments and serve the same purpose. The 90° coupling shown in FIGS. 7 and 8, however, includes a collar 70 which is also bent at 90° in the vicinity of the reference character 71 the shell is made in two or more separable shell portions 72 and 73, of which the shell portion 72 is visible in FIG. 7. The shell portions have two lugs 74 and 75 extending from them at their upper ends, and these shell portions are secured together by a rivet or bolt 76. The shell portions are grooved at 77 to receive the band 38 which holds their lower portions together, the band being beveled at 39 to slide over the bevel 72a of the shell portion in the manner described with reference to FIGS. 1 and 4.

In the embodiments shown in both FIGS. 5 and 7 it should be noted that the tongue and groove type of interengagement retainer between the collar and the threaded fitting 20 is always disposed concentrically with the axis of rotation of the threaded fittings 20 so that they can be freely turned to tighten or loosen the joint, the seal being maintained in FIG. 5 by the O-ring 42 and in FIG. 7 by the O-ring 78, whereby the mechanical integrity of the system is separated from the fluid-tight integrity of the coupling. The mechanical strength of the modifications shown in FIGS. 5 and 7 is also increased by a small step up in the outside diameter of the nipples 40 and 60 near their seals 42 and 78 and a corresponding increase in the inside diameter of the threaded fitting 20 under its threads, the plastic nipples being sufficiently resilient to allow insertion of the threaded fittings over their barbed ends and past the bent portions 44 and 61 of their central portions.

The third modification is shown in FIG. 9 wherein the engagement between the screw fitting 80 and the tubular nipple 90 has been modified. In this embodiment the screw fitting 80 has a bore 81, a threaded portion 82, hex flats 83 and an abutment ring 84. The bore 81 is enlarged a first time at 85, and enlarged a second time at 86 adjacent to a shoulder 87. The screw fitting 80 also has a sleeve portion which is initially cylindrical as shown in broken lines at 88, but is later spun inwardly to the position shown at 89 in solid lines. The tubular nipple 90 is similar to the nipple 10 in FIG. 1 in that it has a central opening 91 through it and an outer cylindrical portion 92 which snugly fits in the bore 86 of the screw fitting. However, the end of the cylindrical portion 92 is reduced in diameter as at 93 to fit inside the cylindrical portion 85 of the bore 81. The reduction in diameter takes place at a shoulder 94 which lies opposite the shoulder 87, an O-ring 95 being located between the shoulders to seal the engagement. The cylindrical portion 92 has an inclined step 96 where it steps down to the barbed portion 97 of the tubular nipple 90, and the sleeve portion of the screw fitting 80 is spun inwardly as at 89 to approach the step 96 but not bind against it, whereby in this modified form of the invention the screw fitting is held in place axially not only by the annular retaining member 98 of the collar 99 cooperating with the abutment ring 84, but also by the spun sleeve portion 89 cooperating with the inclined step 96 of the nipple. Although the step 96 and sleeve 89 are shown at a 45° angle, a 90° angle or any angle therebetween would be satisfactory.

The present invention is not to be limited to the exact embodiments shown in the drawings, for obviously changes can be made within the scope of the following claims.

I claim:

1. A swivel coupling for terminating the end of a resilient hose having a bore therethrough, the coupling comprising:

(a) a tubular nipple having a central opening therethrough and having an outer surface including a cylindrical portion near one end stepping down in diameter at a shoulder to an annularly barbed portion adjacent to the other end, the barbed portion being tightly receivable in the hose bore;

(b) a screw fitting having a passage therethrough with a cylindrical wall portion snuggly receiving the cylindrical portion of the nipple, the fitting having a threaded portion facing away from the hose with wrench flats thereadjacent and the passage stepping down at a shoulder to a diameter sized to just pass said barbed portion of the nipple, said shoulders abutting each other when the coupling is assembled, and the fitting having an annular outwardly-extending abutment therearound adjacent to the hose;

(c) resilient fluid seal means operative between said cylindrical portions;

(d) an annular collar divided longitudinally into multiple shell portions, the collar when its shell are assembled having an internal surface having annular ribs therearound sized to receive the hose and clamp it tightly onto the barbed portion of the nipple, and the collar having near its end adjacent to the screw fitting an internal annular retaining groove shaped to overlie and rotatably engage the annular abutment of the screw fitting, and the collar having around its outer surface an external groove located about midway between the ends of the collar and having a substantially cylindrical surface; and (e) means for retaining the shell portions assembled and tightly clamped on the hose comprising a band having a cylindrical inner surface fitting in the external groove.

2. The swivel coupling as claimed in claim 1, wherein one of said cylindrical portions has an annular groove therein facing toward the other cylindrical portion, and said seal means comprises an O-ring in said annular groove.

3. The swivel coupling as claimed in claim 1, wherein the width of the band in the external groove in the shell portions is wider than the remaining outer surface of the shell portions on either side of the external groove.

4. The swivel coupling as claimed in claim 1, wherein said tubular nipple is bent intermediate its ends so that said cylindrical portion is disposed at an angle to said barbed portion, and said collar being similarly bent intermediate its ends so that its internal cylindrical surface is disposed at a similar angle with respect to its internal surface which includes said annular ribs.

5. The swivel coupling as claimed in claim 4, wherein said means for retaining the shell portions assembled includes separate clamping means securing together the shell portions of the collar on opposite sides of its bend.

6. The swivel coupling as claimed in claim 1, wherein the cylindrical wall portion of the screw fitting is smaller in diameter in the vicinity of the threaded portion and increases at a shoulder to a larger diameter in the vicinity of the abutment, and the cylindrical portion of the nipple is a snug fit in said larger diameter portion of the screw fitting and steps down in diameter at a shoulder to fit into the smaller diameter portion of the screw fitting, the nipple having an annular step down from its cylindrical portion to its barbed portion, the step down being located between the hose and the abutment when the fitting is assembled to the nipple; and the screw fitting having a sleeve portion located opposite said annular step down and displaced inwardly toward the nipple to cooperate with the annular step down and retain the screw fitting rotatably fixed to the nipple.

7. The swivel coupling as claimed in claim 6, wherein said fluid seal means comprises an O-ring around the nipple and located between said shoulders when the screw fitting is assembled to the nipple.

* * * * *